US006465124B1

United States Patent
Medeiros et al.

(10) Patent No.: US 6,465,124 B1
(45) Date of Patent: Oct. 15, 2002

(54) MAGNESIUM ANODE, SEAWATER/ACID/ CATHOLYTE ELECTROLYTE UTILIZING A PALLADIUM AND IRIDIUM CARBON PAPER CATHODE ELECTROCHEMICAL SYSTEM

(75) Inventors: Maria G. Medeiros, Bristol; Eric G. Dow, Barrington, both of RI (US); Russell R. Bessette, Mattapoisett, MA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 68 days.

(21) Appl. No.: 09/632,012

(22) Filed: Jul. 28, 2000

(51) Int. Cl.$^7$ ................................. H01M 4/36
(52) U.S. Cl. ....................... 429/105; 429/101

(58) Field of Search ................................. 429/101, 105

(56) References Cited

U.S. PATENT DOCUMENTS 5,445,905 A * 8/1995 Marsh et al. ............... 429/105

* cited by examiner

Primary Examiner—Carol Chaney
Assistant Examiner—Dah-Wei Yuan
(74) Attorney, Agent, or Firm—Michael J. McGowan; Prithvi C. Lall; Michael F. Oglo

(57) ABSTRACT

The present invention relates to an improved magnesium semi-fuel cell which has a magnesium anode, a seawater/catholyte electrolyte, preferably containing acid to solubilize solid precipitates, and an electrocatalyst composed of palladium and iridium catalyzed onto carbon paper. The acid added to the electrolyte is preferably selected from the group consisting of sulfuric acid, hydrochloric acid, phosphoric acid, acetic acid, and mixtures thereof.

7 Claims, 2 Drawing Sheets

MAGNESIUM ANODE, SEAWATER/ACID/CATHOLYTE ELECTROLYTE UTILIZING A PALLADIUM AND IRIDIUM CARBON PAPER CATHODE ELECTROCHEMICAL SYSTEM

STATEMENT OF GOVERNMENT INTEREST

The invention described herein may be manufactured and used by or for the Government of the United States of America for Governmental purposes without the payment of any royalties thereon or therefor.

CROSS REFERENCE TO OTHER PATENT APPLICATIONS

Not applicable.

BACKGROUND OF THE INVENTION (1) Field of the Invention

The present invention relates to a new electrochemical system based on a magnesium anode and an electrocatalyst of palladium and iridium catalyzed on carbon paper.

(2) Description of the Prior Art

Magnesium seawater batteries have been successfully demonstrated whereby oxygen saturated in the seawater electrolyte is reduced on a catalytic cathode surface opposite a magnesium anode. Early magnesium seawater battery systems are shown in U.S. Pat. No. 3,462,309 to Wilson and U.S. Pat. No. 3,481,790 to Duddy.

Magnesium seawater battery systems generally are highly energy dense systems due to the fact that there is no sodium hydroxide required, greatly reducing the system's weight. However, limited oxygen availability limits specific energies to 220 Watt hr/kg.

Other magnesium-seawater batteries have been developed, all of which include solid electrodes, including silver chloride, cuprous chloride, lead chloride, cuprous iodide, cuprous thiocyanate, and manganese dioxide.

Testing has been accomplished with a magnesium anode in a seawater/hydrogen peroxide electrolyte opposite electrocatalysts of silver foil or planar nickel foil catalyzed with palladium and iridium. All testing was performed in neutral media. The reduction of the hydrogen peroxide took place at the electrocatalytic surface. Cell voltages of 1.1 to 1.2V were observed at an applied current density of 25 mA/cm$^2$ for these tests with durations up to sixty minutes.

The reduction-oxidation (redox) potentials versus Standard Hydrogen Electrode (SHE) associated with the magnesium-hydrogen peroxide system are:

| Anode | $Mg \rightarrow Mg^{2+} + 2e^-$ | 2.37 V | (1) |
|---|---|---|---|
| Cathode | $HO_2^- + H_2O + 2e- \rightarrow 3OH^-$ | 0.88 V | (2) |
| Cell Reaction | $Mg + HO_2^- + H_2O \rightarrow Mg^{2+} + 3OH^-$ | 3.25 V | (3) |

Unfortunately, these theoretical open circuit potentials are reduced and the electrochemical performance inhibited by the following parasitic reactions:

| Decomposition Reaction | $2 H_2O_2 \rightarrow 2 H_2O + O_2 \uparrow$ | (4) |
|---|---|---|
| Direct Reaction | $Mg + HO_2^- + H_2O \rightarrow Mg^{2+} + 3OH^-$ | (5) |
| Precipitation Reactions | $Mg^{2+} + 2OH^- \rightarrow Mg(OH)_2(s)$ | (6) |
|  | $Mg^{2+} + CO_3^- \rightarrow MgCO_3(s)$ | (7) |

Where (s) stands-for solid precipitate

The precipitation reactions produce solid magnesium hydroxide and magnesium carbonate. The magnesium hydroxide results from the interaction of the magnesium cation with the hydroxyl group produced during the reduction of the catholyte, whereas the magnesium carbonate is a result of the magnesium interacting with the carbonates in seawater.

The system is limited by the production of the precipitates in the electrolyte resulting in electrolytic flow blockages, increased gassing rates and internal pressure rates with decreased cell voltages.

SUMMARY OF THE INVENTION

Accordingly, it is an object of the present invention to provide an improved magnesium semi-fuel cell.

It is a further object of the present invention to provide a magnesium semi-fuel cell as above which is a high energy density source for underwater vehicle applications with energy densities approaching 6 to 7 times that of silver-zinc.

The foregoing objects are attained by the semi-fuel cell of the present invention.

In accordance with the present invention, the semi-fuel cell comprises a magnesium anode, a seawater/catholyte electrolyte, preferably containing acid to solubilize solid precipitates, and an electrocatalyst composed of palladium and iridium catalyzed onto carbon paper. The acid added to the electrolyte is preferably selected from the group consisting of sulfuric acid, hydrochloric acid, phosphoric acid, acetic acid, and mixtures thereof.

Other details of the semi-fuel cell of the present invention, as well as other objects and advantages attendant thereto, are set forth in the following detailed description and the accompanying drawings.

DESCRIPTION OF THE PREFERRED EMBODIMENT(S)

As previously discussed, the present invention relates to an improved magnesium semi-fuel cell. The semi-fuel cell of the present invention has a magnesium anode and a seawater/catholyte electrolyte. An acid is added to the electrolyte to solubilize the solid precipitates such as magnesium hydroxide and magnesium carbonate. The cell also has an electrocatalyst composed of palladium and iridium catalyzed onto carbon paper, instead of palladium/iridium catalyzed onto nickel foil or the use of silver Foil, which offers greater surface for the reduction of the catholyte such as hydrogen peroxide.

The acid which may be added to the electrolyte is preferably selected from the group consisting of sulfuric acid, hydrochloric acid, phosphoric acid, acetic acid, and mixtures thereof. Each acid added to the electrolyte may be added at a concentration ranging from 0.01M to 0.1M.

The catholyte portion of the electrolyte is preferably hydrogen peroxide. The electrochemical couples versus SHE for this system are as follows:

| Anode | $Mg \rightarrow Mg^{2+} + 2e^-$ | 2.37 V | (8) |
| Cathode | $H_2O_2 + 2H^+ + 2e^- \rightarrow 2H_2O$ | 1.77 V | (9) |
| Cell Reaction | $Mg + H_2O_2 + 2H^+ \rightarrow Mg^{2+} + 2H_2O$ | 4.14 V | (10) |

The functioning magnesium-hydrogen peroxide semi-fuel cell of the present invention, as previously mentioned, is composed of a magnesium anode and an electrocatalyst of palladium and iridium catalyzed on carbon paper capable of reducing the hydrogen peroxide catholyte. Power is generated on the basis of an occurrence of the above reaction at the anode in which magnesium ions are formed and electrons released. The electrons are-transferred from the anode to the cathode by way of an external circuit in which the electrons perform work on a load. Electrolyte may be passed through the cell at any desired flow rate such as 200 cc/min and may be kept at an elevated temperature such as 55° C. A useful electrolyte comprises 40 g/L seawater, 0.5 M hydrogen peroxide, and 0.1 M sulfuric acid in a two liter volume. A current density of 25 mA/cm$^2$ may be applied to the electrode.

The addition of the acid to the seawater electrolyte in the magnesium semi-fuel cell system has been found to provide a great advantage, that is an increase in theoretical cell voltage from 3.25V to 4.14V. A second advantage of the present invention is an increase in cathodic potential and thus cell voltage when Pd/Ir on carbon paper is used as the electrocatalyst versus the use of a silver foil catalyst. This cathodic voltage increase is also due to the fact that acid is introduced into the seawater/catholyte electrolyte to reduce blockage of the reaction to proceed.

Figure 1:
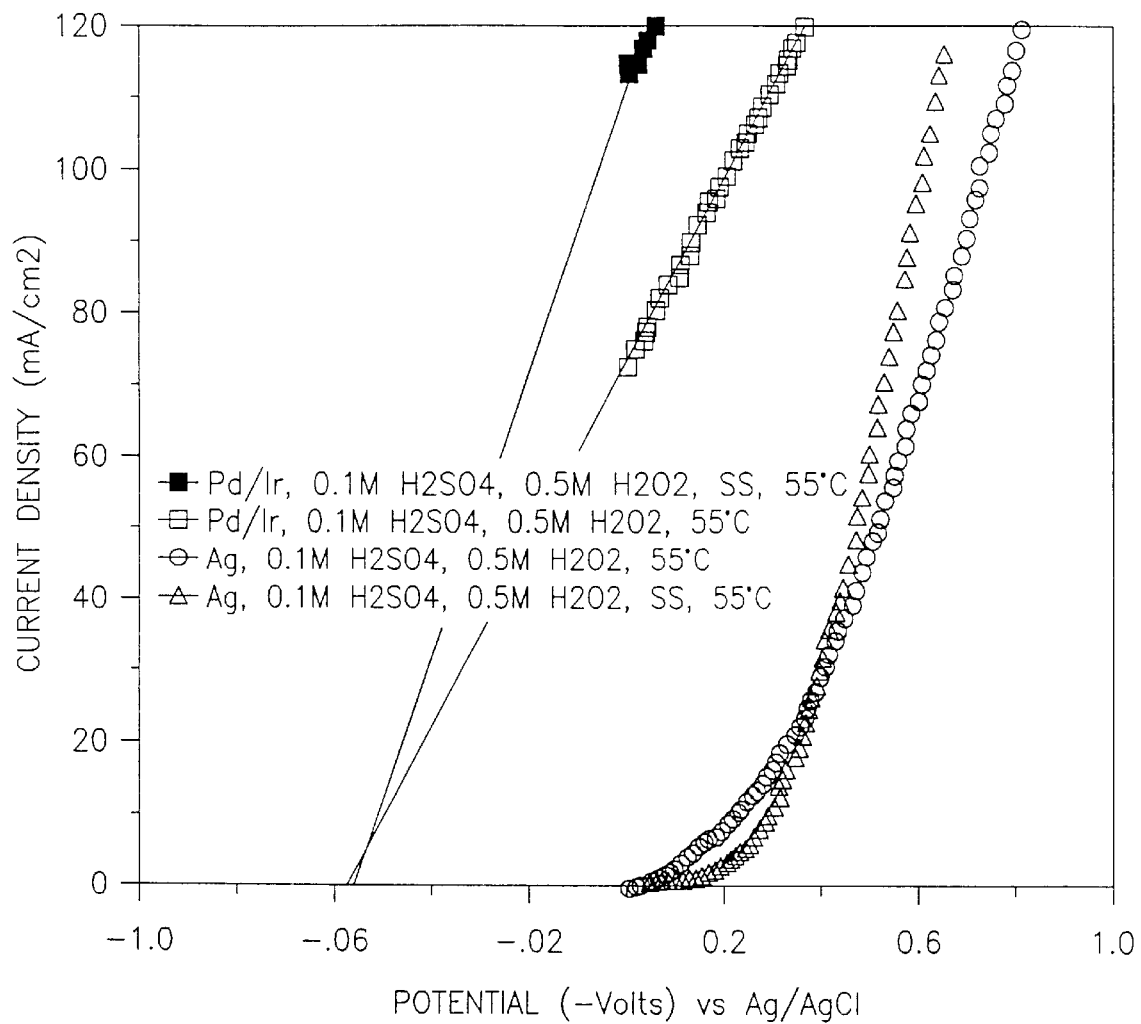
FIG. 1 is a graph showing silver foil vs. palladium/iridium on carbon paper half-cell polarization profiles.

FIG. 1 graphically demonstrates the reason for achieving high voltages when palladium/iridium is catalyzed on a carbon paper substrate and tested under acid/seawater/catholyte electrolyte conditions wherein the electrolyte contains 0.1 M sulfuric acid and 0.5 M hydrogen peroxide and is at a temperature of 55° C. The cell used in this test had a magnesium anode and an electrolyte flow rate of 200 cc/min. The silver foil demonstrates cathodic potentials of −0.4V vs silver/silver chloride (Ag/AgCl) at a current density of 25 mA/cm$^2$; however, when the palladium/iridium on carbon paper is tested under the same conditions the cathodic voltage is increased to +0.4V vs Ag/AgCl. On a cell basis, an increase of 0.8V (800 mV) is expected due to the use of the palladium/iridium carbon electrode in the acid/seawater/catholyte electrolyte.

Figure 2:
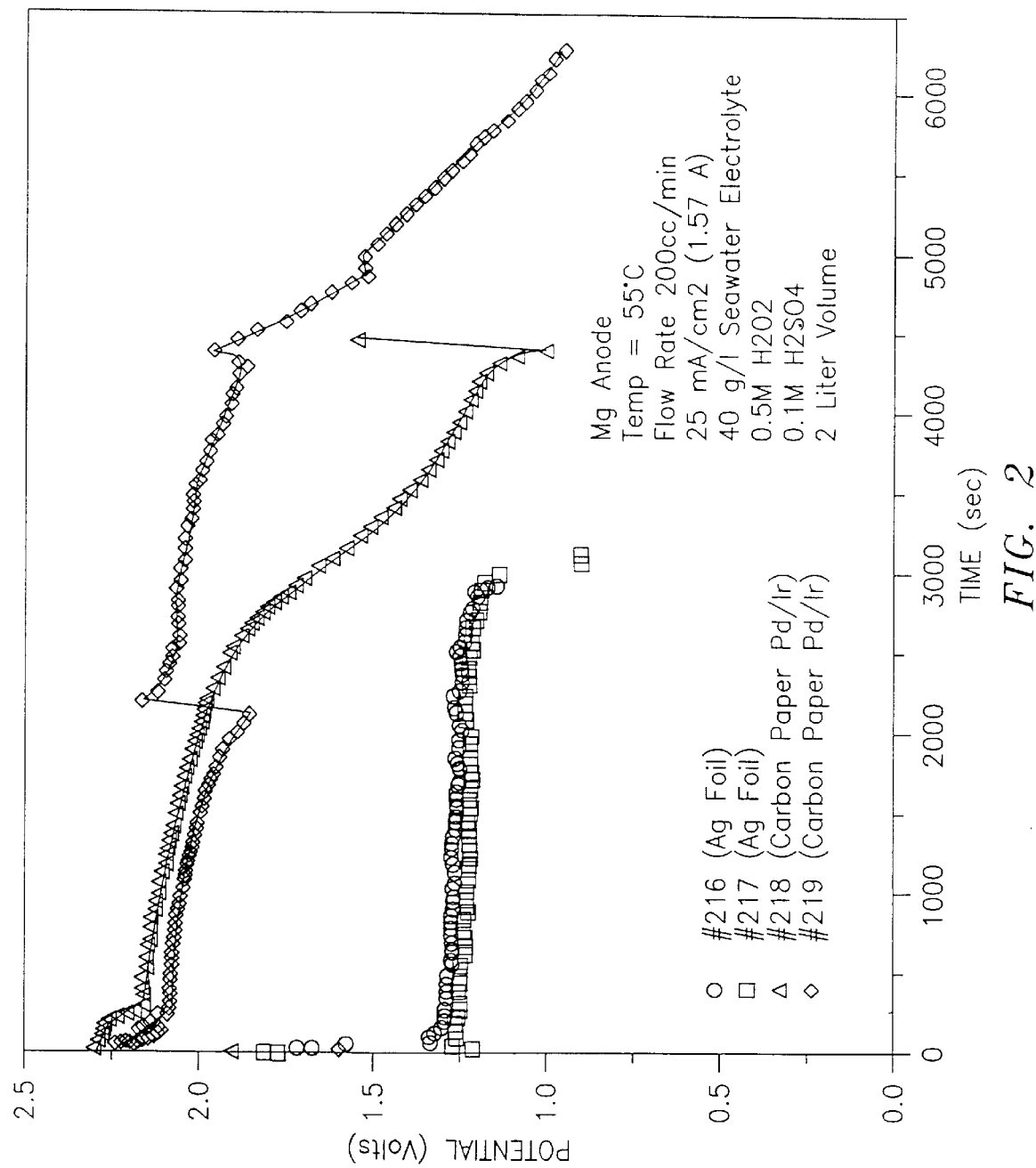
FIG. 2 is a graph illustrating constant current profiles for a magnesium-semi-fuel cell in accordance with the present invention.

FIG. 2 shows a constant current discharge profile at 25 mA/cm$^2$ when the aforementioned electrochemical system was tested. Observed were voltages above 2.12V when a carbon paper catalyzed with palladium/iridium was used in the seawater/acid electrolyte. Also pictured are the silver foil results showing cell voltages of 1.25V. A 70% increased in cell voltages was observed with the use of an acidic electrolyte and a palladium/iridium on carbon paper cathode.

The other advantages of the present invention include: (1) higher voltages (>2.0V) achieved as a result of the introduction of the hydrogen peroxide/acid/seawater electrolyte in conjunction with the combination of the palladium/iridium carbon paper electrocatalyst and the magnesium anode; (2) the reduction of cell stack size on a system basis; and (3) higher energy densities approaching 6–7× that of silver zinc (600–700 Watt hr/kg[m]). A smaller cell stack capable of producing a desireable level of power is due to the ability to obtain higher voltages.

It is apparent that there has been provided in accordance with the present invention a magnesium anode, seawater/acid/catholyte electrolyte, utilizing a palladium/iridium carbon paper cathode electrochemical system which fully satisfies the objects, means and advantages set forth hereinbefore. While the present invention has been described in the context of specific embodiments thereof, other variations, modifications and alternatives will become apparent to those skilled in the art after reading the foregoing description. Therefore, it is intended to embrace those variations, modifications, and alternatives which fall within the broad scope of the appended claims.

What is claimed is:

1. A magnesium semi-fuel cell comprising:

a magnesium anode;

a seawater/catholyte electrolyte;

an electrocatalyst comprising palladium and iridium catalyzed onto carbon paper; and an acid added to the electrolyte to solubilize solid precipitates.

2. The magnesium semi-fuel cell according to claim 1 wherein said catholyte in said seawater/catholyte electrolyte comprises hydrogen peroxide.

3. A magnesium semi-fuel cell comprising:

a magnesium anode;

a seawater/catholyte electrolyte;

an electrocatalyst comprising palladium and iridium catalyzed onto carbon paper; and an acid selected from the group consisting of sulfuric acid, hydrochloric acid, phosphoric acid, acetic acid, and mixtures thereof being added to the electrolyte.

4. The magnesium semi-fuel cell according to claim 3 wherein said acid is added at a concentration ranging from 0.01M to 0.1M.

5. The magnesium semi-fuel cell according claim 3 wherein said acid is sulfuric acid.

6. The magnesium semi-fuel cell according to claim 4, wherein said acid is sulfuric acid added at a concentration ranging from 0.01M to 0.1M.

7. A magnesium semi-fuel cell comprising:

a magnesium anode;

a seawater/catholyte electrolyte;

an electrocatalyst comprising palladium and iridium catalyzed onto carbon paper; and said electrolyte comprising a seawater/hydrogen peroxide/acid electrolyte and the electrochemical couples versus SHE for the cell are as follows:

| Anode | $Mg \rightarrow Mg^{2-} + 2e^-$ | 2.37 V |
| Cathode | $H_2O_2 + 2H^- + 2e^- \rightarrow 2H_2O$ | 1.77 V |
| Cell Reaction | $Mg + H_2O_2 + 2H^- \rightarrow Mg^2 + 2H_2O$ | 4.14 V |

* * * * *